(12) United States Patent
Son et al.

(10) Patent No.: US 12,135,674 B2
(45) Date of Patent: Nov. 5, 2024

(54) ELECTRONIC DEVICE FOR OPERATING SERIAL INTERFACE, AND CONTROL METHOD THEREOF

(71) Applicant: SAMSUNG ELECTRONICS CO., LTD., Suwon-si (KR)

(72) Inventors: Junghwan Son, Suwon-si (KR); Yongjun An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/112,066

(22) Filed: Feb. 21, 2023

(65) Prior Publication Data

US 2023/0205724 A1    Jun. 29, 2023

Related U.S. Application Data

(63) Continuation of application No. PCT/KR2021/011098, filed on Aug. 20, 2021.

(30) Foreign Application Priority Data

Aug. 21, 2020  (KR) .................. 10-2020-0105623

(51) Int. Cl.
*G06F 13/42* (2006.01)
*G06F 13/38* (2006.01)
*G06F 13/40* (2006.01)

(52) U.S. Cl.
CPC ........ *G06F 13/4282* (2013.01); *G06F 13/385* (2013.01); *G06F 13/409* (2013.01)

(58) Field of Classification Search
CPC ... G06F 13/4282; G06F 13/385; G06F 13/409
See application file for complete search history.

(56) References Cited

U.S. PATENT DOCUMENTS 7,652,922 B2   1/2010  Kim et al.
7,934,032 B1 *  4/2011  Sardella .............. G06F 13/4022
                                                     710/316

(Continued)

FOREIGN PATENT DOCUMENTS

KR         20-0231733       5/2001
KR      10-2006-0031476     4/2006

(Continued)

OTHER PUBLICATIONS

International Search Report for PCT/KR2021/011098 mailed Nov. 11, 2021, 5 pages.

(Continued)

*Primary Examiner* — Henry Tsai
*Assistant Examiner* — Aurangzeb Hassan
(74) *Attorney, Agent, or Firm* — Nixon & Vanderhye P.C.

(57) ABSTRACT

An electronic device may include at least one control unit and an interface or a group of peripheral devices. The group of peripheral devices may include a plurality of peripheral devices (e.g., an input module, a sound output module, a display module, an audio module, a haptic module, a sensor module, a camera module, a power management module, and a communication module). The electronic device includes a plurality of peripheral devices and at least one processor connected to the plurality of peripheral devices via a serial interface, wherein the at least one processor may be configured to control the electronic device to continuously transmit, via the serial interface, a single command frame including a single serial control command, and data frames to be delivered to at least two peripheral devices among the plurality of peripheral devices.

18 Claims, 9 Drawing Sheets

(56) References Cited

U.S. PATENT DOCUMENTS

| | | |
|---|---|---|
| 9,602,464 B2 | 3/2017 | Hein et al. |
| 9,727,119 B2 | 8/2017 | Haentzschel et al. |
| 9,832,379 B1 * | 11/2017 | Neglur .................. H04N 25/60 |
| 10,210,118 B2 | 2/2019 | Podsiadlo et al. |
| 10,423,551 B2 | 9/2019 | Mishra et al. |
| 10,572,410 B2 | 2/2020 | O'Shea et al. |
| 10,599,539 B2 | 3/2020 | Ngo et al. |
| 10,906,483 B2 | 2/2021 | Bakos et al. |
| 10,983,552 B2 | 4/2021 | Mishra et al. |
| 10,990,559 B2 | 4/2021 | Wang et al. |
| 11,923,084 B2 * | 3/2024 | Carroll .................. G16H 40/40 |
| 2002/0196853 A1 * | 12/2002 | Liang .................... H04N 19/90 |
| | | 375/E7.206 |
| 2005/0135390 A1 | 6/2005 | Anderson et al. |
| 2006/0079120 A1 | 4/2006 | Lee et al. |
| 2008/0092073 A1 * | 4/2008 | Shih ........................ G06F 8/34 |
| | | 717/109 |
| 2009/0006709 A1 | 1/2009 | Zhao et al. |
| 2009/0045931 A1 * | 2/2009 | Liu .......................... B60Q 1/44 |
| | | 340/463 |
| 2013/0155279 A1 * | 6/2013 | Khan ..................... H04N 25/00 |
| | | 348/E5.031 |
| 2014/0325096 A1 | 10/2014 | Jung et al. |
| 2016/0182250 A1 | 6/2016 | Pourseyed et al. |
| 2019/0349426 A1 * | 11/2019 | Smith ..................... H04L 67/12 |
| 2020/0090808 A1 * | 3/2020 | Carroll ............... A61B 18/1445 |
| 2021/0389367 A1 * | 12/2021 | Wu .......................... H05K 1/02 |

FOREIGN PATENT DOCUMENTS

| | | |
|---|---|---|
| KR | 10-2006-0108709 | 10/2006 |
| KR | 10-2014-0129708 | 11/2014 |

OTHER PUBLICATIONS

Written Opinion of the ISA for PCT/KR2021/011098 mailed Nov. 11, 2021, 5 Pages.

* cited by examiner

| | 910 | | | | | | | |
|---|---|---|---|---|---|---|---|---|
| 900a | Data Frame (911) | | Data Frame (913) | | Data Frame (915) | | Data Frame (917) | |
| | Data #1 (912) | P | Data #2 (914) | P | Data #3 (916) | P | Data #4 (918) | P |
| | | | | | | | | |

| | 920 | | | | | | | |
|---|---|---|---|---|---|---|---|---|
| 900b | Data Frame (921) | | Data Frame (923) | | Data Frame (925) | | Data Frame (927) | |
| | Data #1 (922) | P | Data #2 (924) | P | Data #3 (926) | P | Data #4 (928) | P |
| | | | | | | | | |

| | 930 | | | | | | | |
|---|---|---|---|---|---|---|---|---|
| 900c | Data Frame (931) | | Data Frame (933) | | Data Frame (935) | | Data Frame (937) | |
| | Data #1 (932) | P | Data #2 (934) | P | Data #3 (936) | P | Data #4 (938) | P |
| | | | | | | | | |

| | 940 | | | | | | | |
|---|---|---|---|---|---|---|---|---|
| 900d | Data Frame (941) | | Data Frame (943) | | Data Frame (945) | | Data Frame (947) | |
| | Data #1 (942) | P | Data #2 (944) | P | Data #3 (946) | P | Data #4 (948) | P |
| | | | | | | | | |

FIG.9

ELECTRONIC DEVICE FOR OPERATING SERIAL INTERFACE, AND CONTROL METHOD THEREOF

CROSS-REFERENCE TO RELATED APPLICATIONS

This application is a continuation of International Application No. PCT/KR2021/011098 designating the United States, filed on Aug. 20, 2021, in the Korean Intellectual Property Receiving Office and claiming priority to Korean Patent Application No. 10-2020-0105623, filed on Aug. 21, 2020, in the Korean Intellectual Property Office, the disclosures of which are incorporated by reference herein in their entireties.

BACKGROUND

Field

The disclosure relates to an electronic device and a method for controlling peripheral devices through a serial interface.

Description of Related Art

A $5^{th}$ generation (5G) communication system or a pre-5G communication system (hereinafter, used as a '5G communication system') has been developed to meet increasing traffic demands after commercialization of a $4^{th}$ generation (4G) communication system. The 5G communication system is called a beyond-4G-network communication system or a post-long-term evolution (LTE) system.

The 5G wireless communication system has been continuously evolved and should control several devices through multiple paths in order to simultaneously receive much information in many cases. It is important to transmit a command for the control to be suitable for each situation for RF transmission and reception for multiple paths.

As complexity of the system recently increases and a command transfer time required for each element becomes shorter, a need to efficiently operate the same has increased.

SUMMARY

Embodiments of the disclosure provides an electronic device for controlling some or all of a plurality of peripheral devices through a serial interface and a method of controlling.

Embodiments of the disclosure provide a scheme of an electronic device for controlling a plurality of peripheral devices by internally separating intervals receiving a command by one command transmission and various methods of identifying the same.

The technical subjects pursued in the disclosure are not limited to the above mentioned technical subjects, and other technical subjects which are not mentioned may be clearly understood through the following descriptions by those skilled in the art of the disclosure.

According to various example embodiments of the disclosure, an electronic device may include: at least one controller, an interface, and/or a peripheral device group. The peripheral device group may include a plurality of peripheral devices (for example, the input module, the sound output module, the display module, the audio module, the haptic module, the sensor module, the camera module, the power management module, and the communication module of FIG. 1).

According to various example embodiments of the disclosure, an electronic device includes: a plurality of peripheral devices, and at least one processor connected to the plurality of peripheral devices by a serial interface, wherein the at least one processor is configured to control the electronic device to: successively transmit one command frame and data frames, to be transferred to at least two peripheral devices among the plurality of peripheral devices, included in one serial control command, through the serial interface.

According to various example embodiments of the disclosure, the plurality of peripheral devices may include: at least one pin configured to receive signals controlling activation or deactivation for receiving data frames, and at least one processor configured to apply different voltages to the at least one pin for the at least two peripheral devices.

According to various example embodiments of the disclosure, the plurality of peripheral devices may include at least one pin configured to receive signals controlling activation or deactivation for receiving data frames, and the at least one pin may include ground pins or no-connect (NC) pins.

An electronic device designed to control a plurality of peripheral devices at once according to various example embodiments can efficiently perform complex operations required complicated many CA combinations/MIMO/5G and reduce side effects such as malfunction generated by the control of many devices within a short time.

All the same electronic devices can be controlled by one command as long as a pre-appointed structure is designed for transmission, reception, and performance of the command through a serial interface according to various embodiments.

The effects that can be realized by the disclosure are not limited to the above-described effects, and other effects that have not been mentioned may be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9 is a diagram illustrating an example in which the number of plurality of peripheral devices is 4 for data frames and data in the structure in which an electronic device performs communication through a serial interface according to various embodiments.

In connection with description of drawings, the same or similar reference numerals may be used for the same or similar elements.

DETAILED DESCRIPTION

Figure 1:
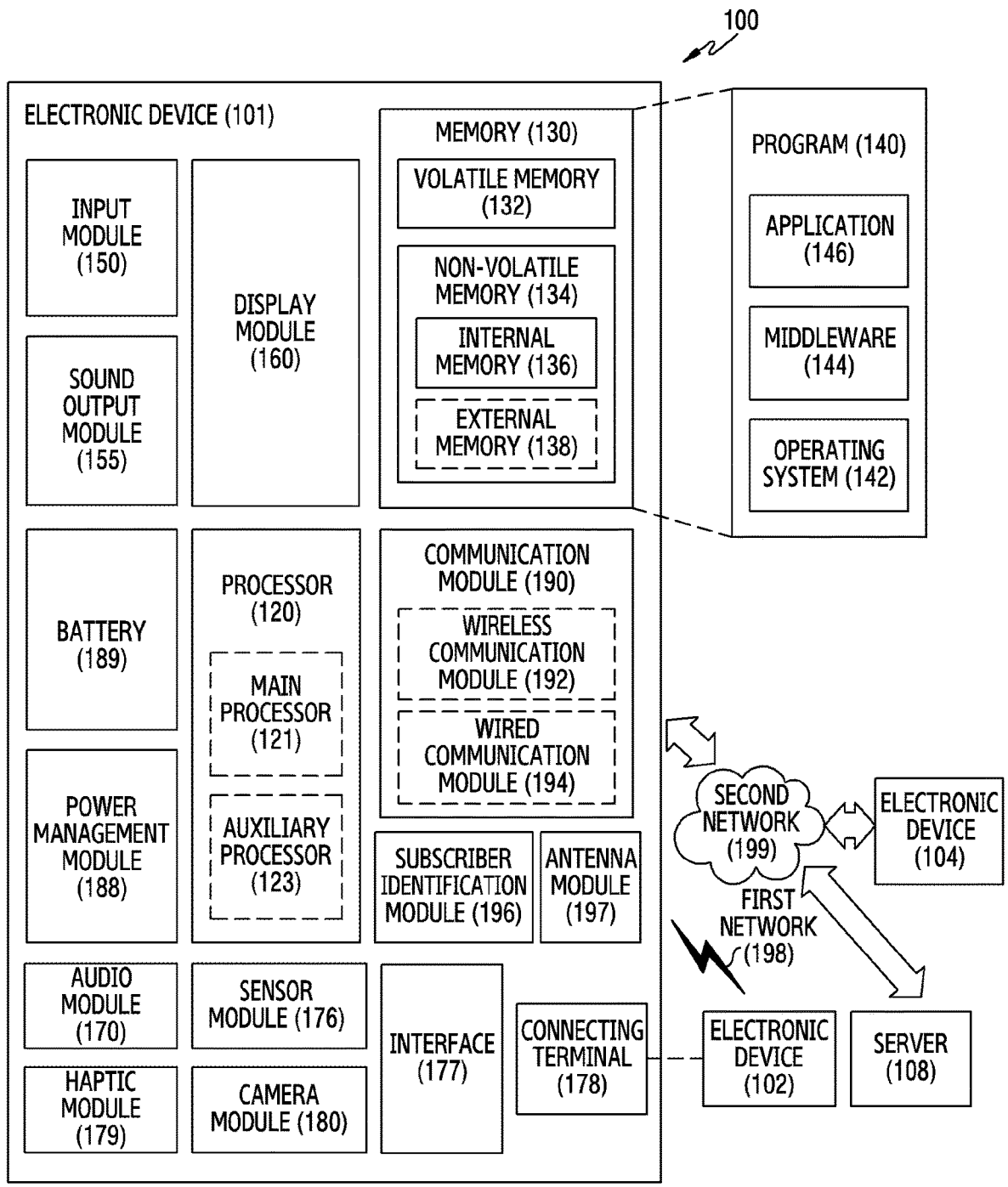
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
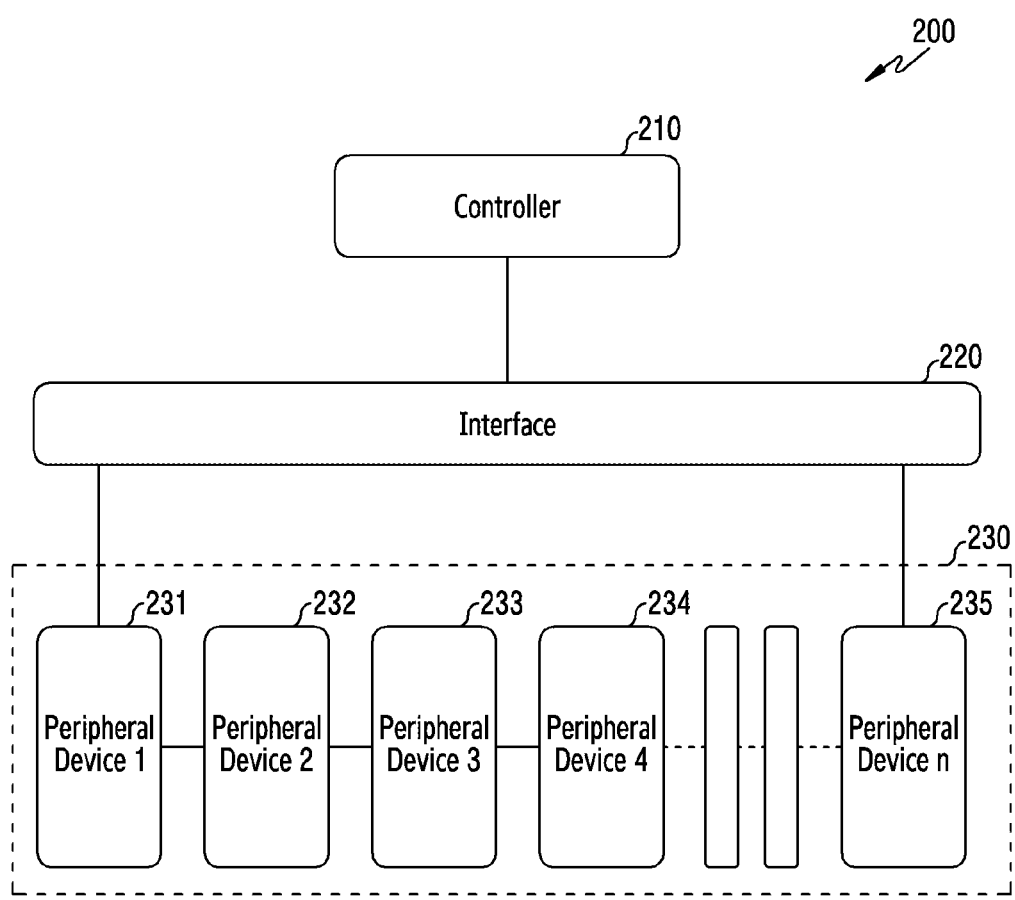
FIG. 2 is a diagram illustrating an example structure in which an electronic device performs communication through a serial interface according to various embodiments.

FIG. 2 is a diagram 200 illustrating an example structure in which an electronic device performs communication through a serial interface according to various embodiments.

Referring to FIG. 2, an electronic device (for example, the electronic device 101 of FIG. 1) according to an embodiment may include at least one controller 210 (e.g., including processing/control circuitry) (for example, the processor 120 of FIG. 1), an interface (e.g., including interface circuitry) 220, or a peripheral device group (e.g., including at least one peripheral device) 230. Hereinafter, for convenience of description, it is assumed that the electronic device 101 includes one controller 210. The peripheral device group 230 may include a plurality of peripheral devices 231, 232, 233, 234 . . . 235 (for example, the input module 150, the sound output module 155, the display module 160, the audio module 170, the haptic module 179, the sensor module 176, the camera module 180, the power management module 188, and the communication module 190 of FIG. 1). However, it will be understood that the disclosure is not limited thereto.

According to an embodiment, the interface 220 may support signal exchange between devices based on a serial interface communication scheme. The interface 220 may be one path through which at least one main device (for example, at least one controller 210) transmits signals to a plurality of sub devices (for example, the plurality of peripheral devices 231, 232, 233, 234 . . . 235 of FIG. 2) or at least one main device receives signals from the plurality of sub devices. The interface 220 may transmit a signal, such as a command generated by at least one controller 210, in order to control, for example, at least one peripheral device among the plurality of peripheral devices 231, 232, 233, 234 . . . 235.

According to an embodiment, the interface 220 may have a structure of a mobile industry processor interface (MIPI) which is an interface for connecting an application processor (AP) which is one of the electronic devices to configure a smartphone, a communication processor (CP), a radio frequency integrated circuit (RFIC) (for example, at least one controller 210 of FIG. 2), and a plurality of peripheral devices (for example, the peripheral devices 231, 232, 233, 234 . . . 235 of FIG. 2). In the structure of the MIPI, for example, a transmitter (for example, the AP) may control a receiver (for example, the plurality of peripheral devices) using data and clock (CLK).

According to an embodiment, the plurality of peripheral devices 231, 232, 233, 234 . . . 235 included in a peripheral device group 230 may be elements included in the electronic device 101, which perform different functions or the same function. The peripheral device group 230 may be, for example, a transmission module for transmitting a radio frequency signal (RF signal), a reception module for receiving an RF signal, or a combination of the transmission/reception modules for transmitting/receiving the RF signal. For example, the peripheral device group 230 may include one transmission/reception module and three reception modules.

According to an embodiment, the plurality of peripheral devices 231, 232, 233, 234 . . . 235 included in the peripheral device group 230 may be controlled by the controller 210 through the interface 220 and perform corresponding functions. The peripheral device group 230 may include, for example, peripheral devices for transmitting/receiving or receiving RF signals. For example, the peripheral devices for transmitting/receiving or receiving RF signals may include at least one transmission and reception module (TRx module) and/or at least one transmission module (Tx module). For example, the peripheral device group 230 may include one transmission and reception module and N transmission only modules.

According to an embodiment, the plurality of peripheral devices 231, 232, 233, 234 . . . 235 may acquire data from a specific location of a command (for example, a data frame designated thereto among a plurality of data frames included in the command) received through the interface 220. The plurality of peripheral devices 231, 232, 233, 234 . . . 235 are required to recognize the specific location at which the data is acquired. Each of the plurality of peripheral devices 231, 232, 233, 234 . . . 235 may include, for example, one or a plurality of pins and recognize a data frame to acquire data from a command received on the basis of a signal (for example, a voltage level) applied through the one or the plurality of pins.

According to an embodiment, each of the plurality of peripheral devices 231, 232, 233, 234 . . . 235 may include a plurality of pins and recognize a data frame to acquire data from a command received on the basis of a voltage applied through the plurality of pins.

According to an embodiment, each of the plurality of peripheral devices 231, 232, 233, 234 . . . 235 may include at least one pin and recognize a data frame to acquire data from a command received on the basis of a voltage level applied through the one pin.

According to an embodiment, each of the plurality of peripheral devices 231, 232, 233, 234 . . . 235 may include one or a plurality of pins, a data frame to be acquired may be determined by the one or the plurality of pins, and the one or the plurality of pins may be ground pins or no-connect (NC) pins.

According to an embodiment, the controller 210 may exchange signals with the plurality of peripheral devices 231, 232, 233, 234 . . . 235 included in the peripheral device group 230 through the interface 220. The controller 210 may control some or all of the plurality of peripheral devices 231, 232, 233, 234 . . . 235 through the interface 220 using, for example, data and clock.

According to an embodiment, the controller 210 may determine one or a plurality of peripheral devices to be controlled among the plurality of peripheral devices 231, 232, 233, 234 . . . 235. The controller 210 may generate one command for controlling the determined on or plurality of peripheral devices. The controller 210 may transmit the generated command through the interface 220. In this case, the controller 210 can control target peripheral devices to perform desired operations using one command. The target peripheral devices may be, for example, a plurality of peripheral devices 231, 232, 233, 234 . . . 235 connected through the interface 220 or one or a plurality of peripheral devices to be controlled among the plurality of peripheral devices 231, 232, 233, 234 . . . 235.

According to an embodiment, a command which can be generated by the controller 210 may have a multi-device control structure. The multi-device control structure may have a structure configured by, for example, one common frame and a plurality of data frames. In this case, a command having the multi-device control structure may include one common frame and a plurality of data frames. The common frame included in the command may include fields in which information to be shared by the plurality of peripheral devices (for example, peripheral devices to be controlled) can be recorded. The common frame may include, for example, fields for recording a slave address, write/read, a register, a USID configuration, and a register address. The plurality of data frames included in the command may correspond to the plurality of peripheral devices 231, 232, 233, 234 . . . 235 connected through the interface 220 or a plurality of peripheral devices to be controlled among the plurality of peripheral devices 231, 232, 233, 234 . . . 235. For example, the data frames included in the command may correspond to the plurality of peripheral devices 231, 232, 233, 234 . . . 235 or the plurality of peripheral devices to be controlled among the plurality of peripheral devices 231, 232, 233, 234 . . . 235 in one-to-one correspondence. For example, the data frames included in the command may include data for controlling one of the plurality of peripheral devices 231, 232, 233, 234 . . . 235 or the plurality of peripheral devices to be controlled among the plurality of peripheral devices 231, 232, 233, 234 . . . 235.

Figure 3:
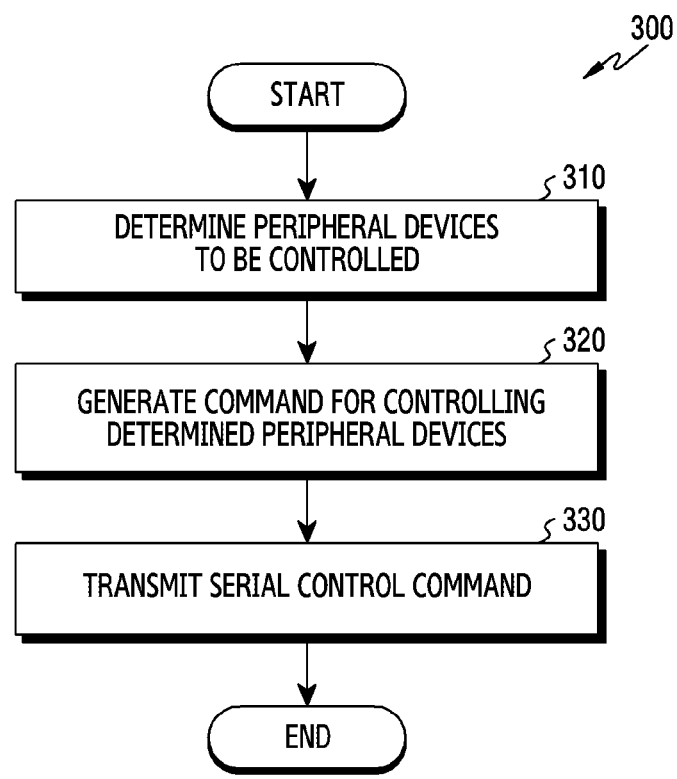
FIG. 3 is a flowchart illustrating example control flow in which an electronic device performs communication through a serial interface according to various embodiments.

FIG. 3 is a flowchart illustrating example control flow in which an electronic device (for example, the electronic device 101 of FIG. 1) performs communication through a serial interface according to various embodiments.

The subject of the operations of the flowchart 300 illustrated in FIG. 3 may be understood as the electronic device (for example, the electronic device 101 of FIG. 1) or at least one controller (for example, the controller 210 of FIG. 2) of the electronic device.

Referring to FIG. 3, in operation 310 according to an embodiment, the controller may determine one or a plurality of peripheral devices to be controlled among the plurality of peripheral devices 231, 232, 233, 234 . . . 235. The target peripheral devices may be, for example, a plurality of peripheral devices 231, 232, 233, 234 . . . 235 connected through the interface 220 or one or a plurality of peripheral devices to be controlled among the plurality of peripheral devices 231, 232, 233, 234 . . . 235.

In operation 320 according to an embodiment, the controller 210 may generate one command for controlling the determined one or plurality of peripheral devices.

According to an embodiment, the command which can be generated by the controller 210 may have a multi-device control structure. The multi-device control structure may have a structure configured by, for example, one common frame and a plurality of data frames. In this case, a command having the multi-device control structure may include one common frame and a plurality of data frames. The common frame included in the command may include fields in which information to be shared by the plurality of peripheral devices (for example, peripheral devices to be controlled) can be recorded. The common frame may include, for example, fields for recording a slave address, write/read, a register, a USID configuration, and a register address. The plurality of data frames included in the command may correspond to the plurality of peripheral devices 231, 232, 233, 234 . . . 235 connected through the interface 220 or a plurality of peripheral devices to be controlled among the plurality of peripheral devices 231, 232, 233, 234 . . . 235. For example, the data frames included in the command may correspond to the plurality of peripheral devices 231, 232, 233, 234 . . . 235 or the plurality of peripheral devices to be controlled among the plurality of peripheral devices 231, 232, 233, 234 . . . 235 in one-to-one correspondence. That is, the data frames included in the command may include data for controlling the plurality of peripheral devices 231, 232, 233, 234 . . . 235 or one of the plurality of peripheral devices to be controlled among the plurality of peripheral devices 231, 232, 233, 234 . . . 235.

In operation 330 according to an embodiment, the controller 210 may transmit the generated serial control command through the interface 220. In this case, the controller 210 can control the target peripheral devices to perform desired operations using the one generated serial control command. The target peripheral devices may be, for example, a plurality of peripheral devices 231, 232, 233, 234 . . . 235 connected through the interface 220 or one or a plurality of peripheral devices to be controlled among the plurality of peripheral devices 231, 232, 233, 234 . . . 235.

According to an embodiment, the target peripheral devices may receive the serial control command from the controller through the interface and perform corresponding operations by the received serial control command. The target peripheral devices receiving the serial control command and performing the corresponding operations therethrough have been already described with reference to FIG. 2, and thus an overlapping description is not made.

Figure 4:
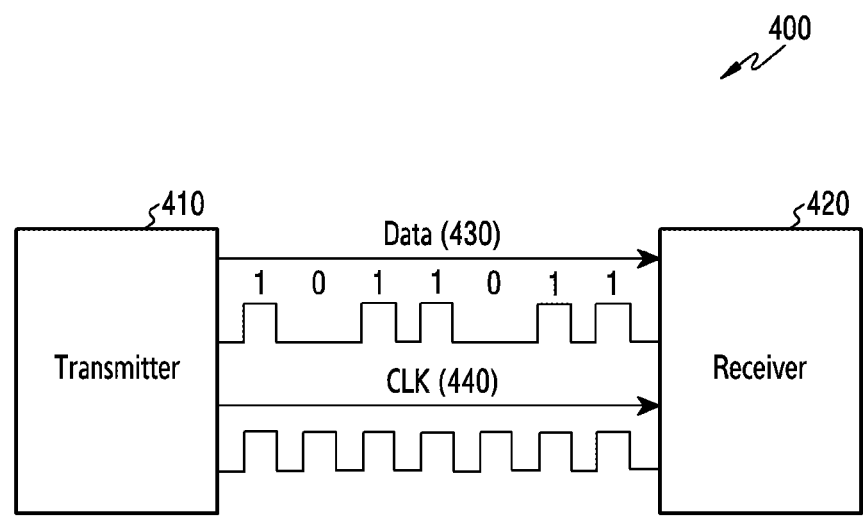
FIG. 4 is a diagram illustrating an example structure in which an electronic device performs communication through a serial interface according to various embodiments.

FIG. 4 is a diagram 400 illustrating an example structure in which an electronic device (for example, the electronic device 101 of FIG. 1) performs communication through a serial interface according to various embodiments. The structure for performing communication through the serial interface illustrated in FIG. 4 may be, for example, an MIPI structure.

Referring to FIG. 4, the MIPI structure according to an embodiment may be an interface for connecting an application processor (AP) which is one of the electronic devices to configure a smartphone, a communication processor (CP), and a radio frequency integrated circuit (RFIC). In the MIPI structure, for example, a transmitter 410 (for example, the AP) may control a receiver 420 (for example, the plurality of peripheral devices) using data 430 and a clock (CLK) 440. In the MIPI structure, for example, a signal, such as a command, generated by the transmitter 410 (for example, at least one controller 210) may be transmitted to control at least one of the plurality of peripheral devices 231, 232, 233, 234 . . . 235.

Figure 5:
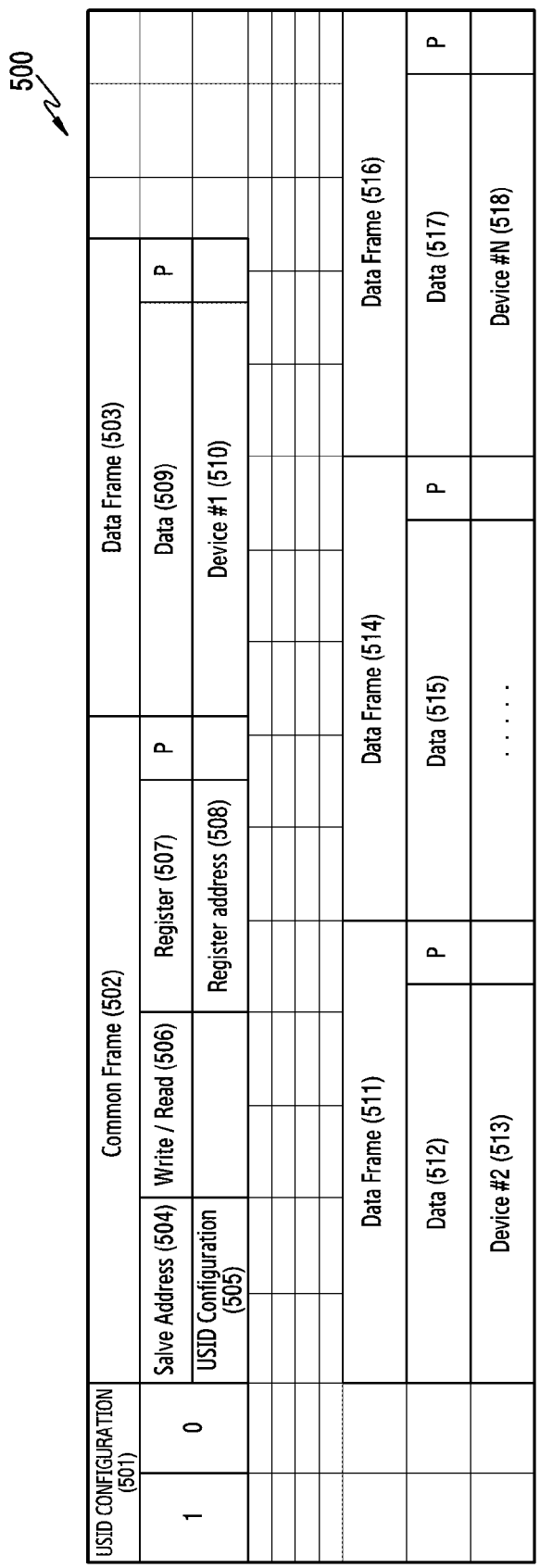
FIG. 5 is a diagram illustrating an example structure in which an electronic device performs communication through a serial interface for each frame according to various embodiments.

FIG. 5 is a diagram 500 illustrating an example structure in which an electronic device (for example, the electronic device 101 of FIG. 1) performs communication through a serial interface according to various embodiments.

Referring to FIG. 5, a command 500 according to an embodiment may include one common frame 502 and a plurality of data frames 503, 511, 514 . . . 516.

In an embodiment, the command 500 may have a multi-device control structure. In this case, the command having the multi-device control structure may include one common frame 502 and the plurality of data frames 503, 511, 514 . . . 516. The common frame 502 included in the command may include fields in which information to be shared by a plurality of peripheral devices (for example, peripheral devices to be controlled) can be recorded. The one common frame 502 may include, for example, fields for recording a slave address 504, a USID configuration 505, write/read 506, a register 507, and a register address 508. The plurality of data frames 503, 511, 514 . . . 516 included in the command may correspond to a plurality of peripheral devices 510, 513 . . . 518 connected through the interface 220 or a plurality of peripheral devices to be controlled among the plurality of peripheral devices 510, 513 . . . 518. For example, the plurality of data frames 503, 511, 514 . . . 516 included in the command may correspond to the plurality of peripheral devices 510, 513 . . . 518 or the plurality of peripheral devices to be controlled among the plurality of peripheral devices 510, 513 . . . 518 in one-to-one correspondence. That is, the plurality of data frames 503, 511, 514 . . . 516 included in the command may include data 509, 512, 515 . . . 517 for controlling one of the plurality of peripheral devices 510, 513 . . . 518 or the plurality of peripheral devices to be controlled among the plurality of peripheral devices 510, 513 . . . 518.

Figure 6:
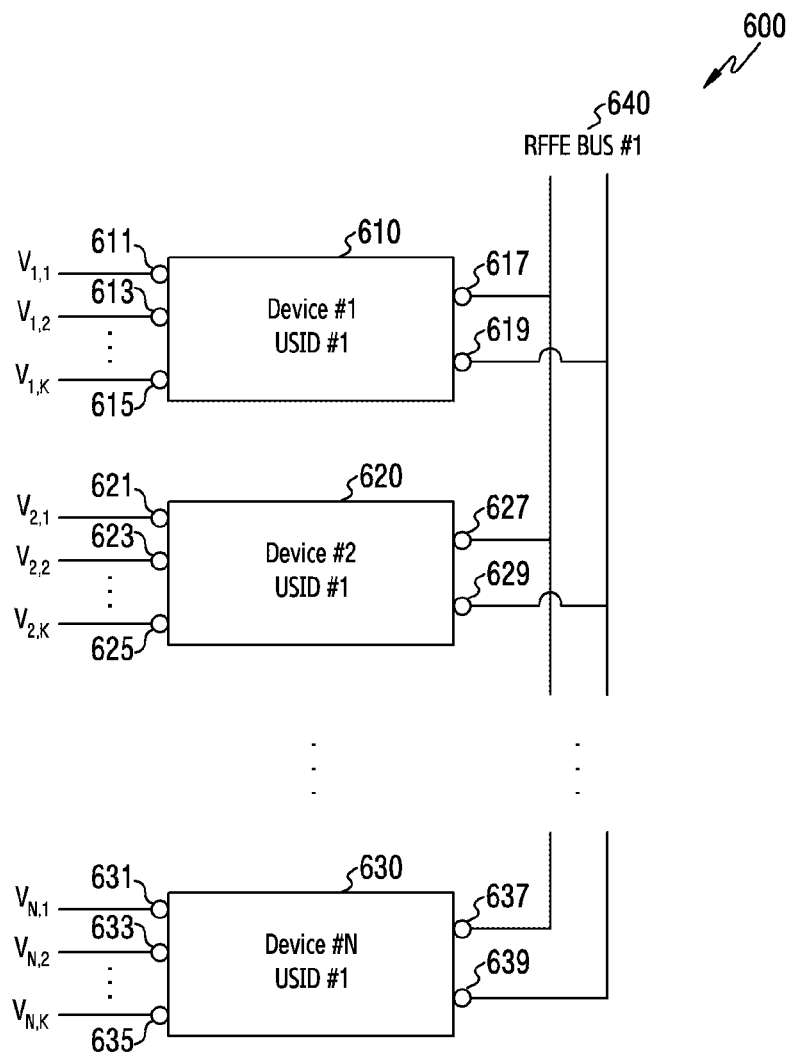
FIG. 6 is a diagram illustrating an example structure in which an electronic device performs communication through a serial interface according to various embodiments.

FIG. 6 is a diagram 600 illustrating an example structure in which an electronic device (for example, the electronic device 101 of FIG. 1) performs communication through a serial interface according to various embodiments.

Referring to FIG. 6, a structure for performing communication through the serial interface according to an embodiment may be, for example, a structure of a scheme of allocating pins 611, 613, 615, 617, 619, 621, 623, 625, 627, 629 . . . 631, 633, 635, 637, 639.

According to an embodiment, a plurality of peripheral devices 610, 620 . . . 630 may include a plurality of pins 611, 613, 615, 617, 619, 621, 623, 625, 627, 629 . . . 631, 633, 635, 637, 639, and the plurality of pins 611, 613, 615, 617, 619, 621, 623, 625, 627, 629 . . . 631, 633, 635, 637, 639 may include a plurality of first pins 611, 613, 615, 621, 623, 625 . . . 631, 633, 635 per peripheral device and a plurality of second pins 617, 619, 627, 629 . . . 637, 639 (two pins per peripheral devices).

The plurality of first pins 611, 613, 615, 621, 623, 625 . . . 631, 633, 635 may be, for example, pins into which signals indicating whether to receive a command can be input. The plurality of peripheral devices 610, 620 . . . 630 may determine whether to receive data frames from the command on the basis of signals (for example, voltage levels) applied through the first pins. The plurality of second pins 617, 619, 627, 629 . . . 637, 639 may be, for example, pins for receiving a command. The command may include one common frame and a plurality of data frames.

The plurality of peripheral devices 610, 620 . . . 630 may recognize data frames to acquire data from the command received on the basis of the signals (for example, voltage levels) applied through the plurality of first pins 611, 613, 615, 621, 623, 625 . . . 631, 633, 635.

According to an embodiment, the plurality of peripheral devices 610, 620 . . . 630 may include a plurality of first pins and a plurality of second pins 611, 613, 615, 617, 619, 621, 623, 625, 627, 629 . . . 631, 633, 635, 637, 639, and may recognize data frames to acquire data from the command received on the basis of the voltages applied through the plurality of first pins 611, 613, 615, 621, 623, 625 . . . 631, 633, 635 among the plurality of first pins and the plurality of second pins 611, 613, 615, 617, 619, 621, 623, 625, 627, 629 . . . 631, 633, 635, 637, 639.

[Table 1] below shows the case in which it is assumed that the number of plurality of peripheral devices 610, 620 . . . 630 is 4 (N=4) according to an embodiment. In [Table 1] below, data frames may be determined through $V_1$ and $V_2$. Voltage High and voltage Low are not determined according to comparison between highness and lowness of two voltages, and may be determined to be high when the voltage is higher than a reference value and determined to be low when the voltage is lower than the reference value.

For example, when the reference value is configured as 1 V, the input voltage higher than 1 V may be determined to be high and the input voltage lower than 1 V may be determined to be low. For example, 1.8 V may be input as high and 0 V may be input as low.

TABLE 1

| $V_1$ | $V_2$ | Data Frame Index |
|---|---|---|
| High | High | #1 |
| Low | Low | #2 |
| High | Low | #3 |
| Low | High | #4 |

Referring to [Table 1] above, when a voltage (V-High) higher than the reference value is applied with respect to $V_1$ and $V_2$, data frame #1 is recognized. When a voltage (V-Low) lower than reference value is applied with respect to $V_1$ and $V_2$, data frame #2 is recognized. When the voltage (V-High) higher than the reference value is applied for $V_1$ and the voltage (V-Low) lower than reference value is applied for $V_2$, data frame #3 is recognized. Last, when the voltage (V-Low) lower than the reference value is applied for $V_1$ and the voltage (V-High) higher than reference value is applied for $V_2$, data frame #4 is recognized.

According to an embodiment, each of the plurality of peripheral devices 610, 620 . . . 630 may have a data frame, which has been determined to acquire data from the received command, and the data frame may be determined through a signal (for example, a voltage level) applied through the plurality of first pins 611, 613, 615, 621, 623, 625 . . . 631, 633, 635 included in each of the plurality of peripheral devices 610, 620 . . . 630.

According to an embodiment, the plurality of peripheral devices 610, 620 . . . 630 may include first pins and the plurality of second pins 611, 613, 615, 621, 623, 625 . . . 631, 633, 635, and recognize data frames 617, 619, 627, 629 . . . 637, 639 to acquire data from the command received on the basis of the voltage corresponding to voltage High or voltage Low applied through the first pins and the plurality of second pins 611, 613, 615, 621, 623, 625 . . . 631, 633, 635.

The plurality of peripheral devices 610, 620 . . . 630 may acquire data from a specific location of the command (for example, a data frame designated thereto among a plurality of data frames included in the command) received through the interface 220, the interface may include, for example, a bus, a general purpose input and output (GPIO), a serial peripheral interface (SPI), or a mobile industry processor interface (MIPI), and the plurality of peripheral devices 610, 620 . . . 630 may be connected to each other through the interface 220 and exchange signals (for example, commands or data). The MIPI may be, for example, RFFE, BUS #1 640.

Figure 7:
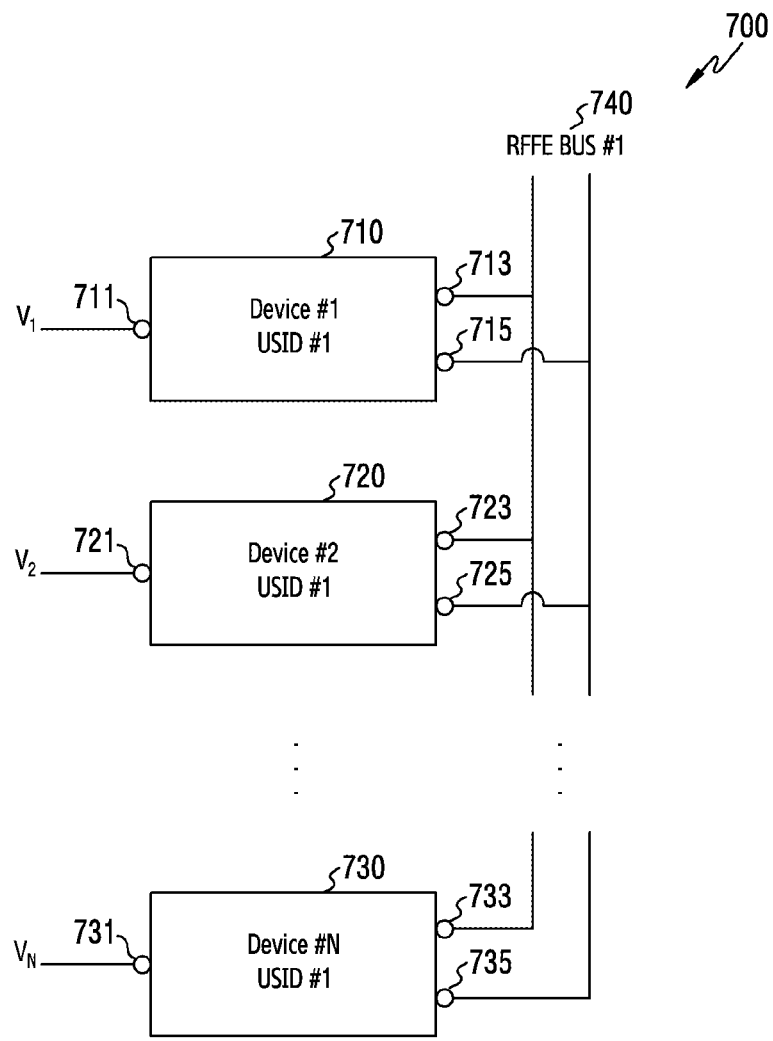
FIG. 7 is a diagram illustrating another example structure in which the electronic device performs communication through the serial interface according to various embodiments.

FIG. 7 is a diagram 700 illustrating an example structure in which the electronic device (for example, the electronic device 101 of FIG. 1) performs communication through the serial interface according to various embodiments.

Referring to FIG. 7, the structure for performing communication through the serial interface according to an embodiment may be, for example, a structure of a voltage level scheme.

According to an embodiment, a plurality of peripheral devices 710, 720 . . . 730 may include a plurality of pins 711, 713, 715, 721, 723, 725 . . . 731, 733, 735, and the plurality of pins 711, 713, 715, 721, 723, 725 . . . 731, 733, 735 may include a plurality of first pins 711, 721 . . . 731 (one pin per peripheral device) and a plurality of second pins 713, 715, 723, 725 . . . 733, 735 (two pins per peripheral device).

The plurality of first pins 711, 721 . . . 731 may be, for example, pins into which signals indicating whether to receive a command can be input. The peripheral devices 710, 720 . . . 730 may determine whether to receive data frames from the command on the basis of signals (for example, voltage levels) applied through the first pins. The plurality of second pins 713, 715, 723, 725 . . . 733, 735 may be, for example, pins for receiving a command. The command may include one common frame and a plurality of data frames.

The plurality of peripheral devices 710, 720 . . . 730 may recognize data frames to acquire data from the command received on the basis of the signals (for example, voltage levels) applied through the plurality of first pins 711, 721 . . . 731.

According to an embodiment, the plurality of peripheral devices 710, 720 . . . 730 may include the plurality of first pins and the plurality of second pins 711, 713, 715, 721, 723, 725 . . . 731, 733, 735, and may recognize data frames to acquire data from the command received on the basis of the voltage levels applied through the first pins 711, 721 . . . 731 (one pin per peripheral device) among the plurality of first pins and the plurality of second pins 711, 713, 715, 721, 723, 725 . . . 731, 733, 735.

According to an embodiment, a power source required for an operation of a device may be allocated to the device, and each peripheral device may operate by receiving a pre-defined data frame according to a voltage level at which power of each power source is supplied. In this case, a scheme of making an input by selecting different power sources among internal power sources or switching to a desired voltage through a resistor before a peripheral device may be applied.

[Table 2] below shows the case in which it is assumed that the number of plurality of peripheral devices 710, 720 . . . 730 is 4 (N=4) according to an embodiment. In [Table 2] below, a data frame may be determined through $V_{level}$. For example, since $V_{level}$ which is the voltage level of the electronic device may have an error, $V_{level}$ can have a predetermined range. For example, $V_{level}$ #1 which is a first electronic device voltage level may have a range of 0 V to 0.6 V, $V_2$ 0.7 V to 1.2 V, $V_3$ 1.3 V to 1.8 V, and $V_4$ 1.9 V to 2.4 V.

TABLE 2

| $V_{level}$ | Data Frame Index |
|---|---|
| $V_1$ | #1 |
| $V_2$ | #2 |
| $V_3$ | #3 |
| $V_4$ | #4 |

Referring to [Table 2] above, when $V_1$ is applied to $V_{level}$ among $V_1$, $V_2$, $V_3$, and $V_4$, data frame #1 is recognized. When $V_2$ is applied, data frame #2 is recognized. When $V_3$ is applied, data frame #3 is recognized. Last, when $V_4$ is applied, data frame #4 is recognized.

According to an embodiment, each of the plurality of peripheral devices 710, 720 . . . 730 may have a determined data frame to acquire data from the received command, and the data frame may be determined through a signal (for example, voltage level) applied through the plurality of first pins 711, 721 . . . 731 included in the plurality of peripheral devices 710, 720 . . . 730.

According to an embodiment, the plurality of peripheral devices 710, 720 . . . 730 may acquire data from a specific location of the command (for example, a data frame designated thereto among a plurality of data frames included in the command) received through the interface 220, the interface may include, for example, a bus, a general purpose input and output (GPIO), a serial peripheral interface (SPI), or a mobile industry processor interface (MIPI), and the plurality of peripheral devices 710, 720 . . . 730 may be connected to each other through the interface 220 and exchange signals (for example, commands or data). The MIPI may be, for example, RFFE BUS #1 740.

Figure 8:
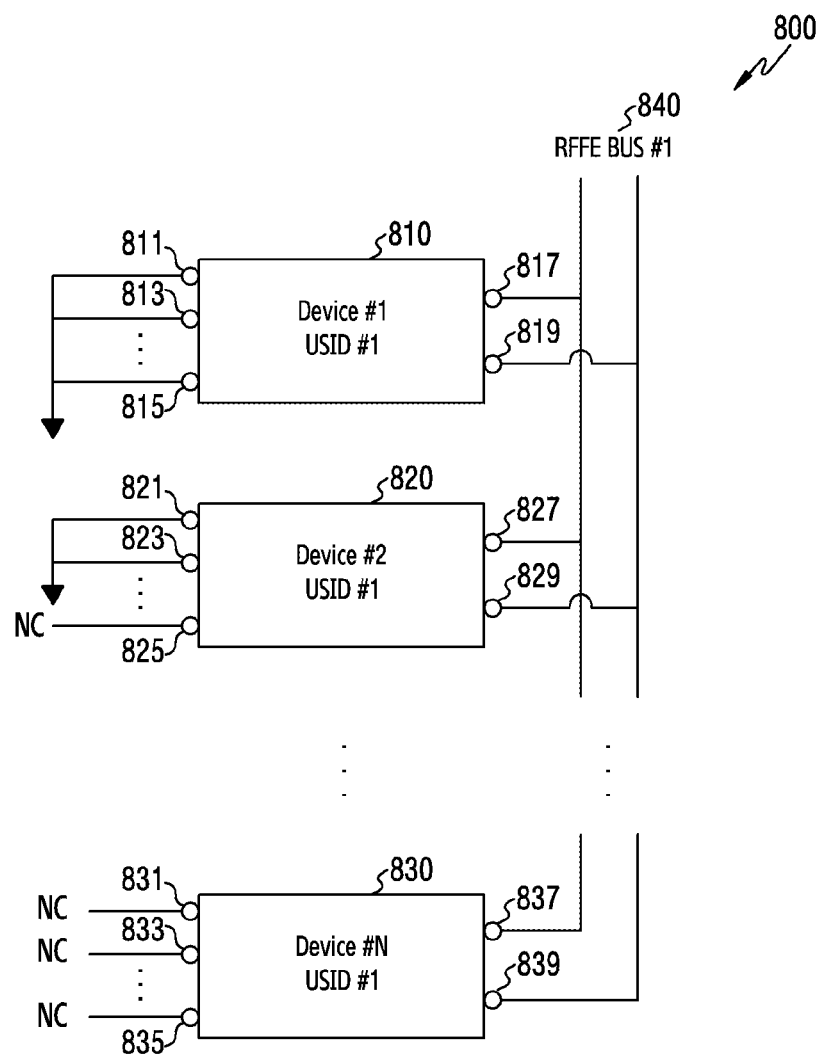
FIG. 8 is a diagram illustrating another example structure in which the electronic device performs communication through the serial interface according to various embodiments.

FIG. 8 is a diagram 800 illustrating an example structure in which the electronic device (for example, the electronic device 101 of FIG. 1) performs communication through the serial interface according to various embodiments.

Referring to FIG. 8, the structure for performing communication through the serial interface according to an embodiment may be, for example, a structure in which ground pins 811, 813, 815, 821, 823 or no-connect (NC) pins 825 . . . 831, 833 . . . 835 are included.

According to an embodiment, a plurality of peripheral devices 810, 820 . . . 830 may include a plurality of pins 811, 813, 815, 817, 819, 821, 823, 825, 827, 829 . . . 831, 833, 835, 837, 839, and the plurality of pins 811, 813, 815, 817, 819, 821, 823, 825, 827, 829 . . . 831, 833, 835, 837, 839 may include a plurality of first pins 811, 813, 815, 821, 823, 825 . . . 831, 833, 835 (a plurality of pins per peripheral device) and a plurality of second pins 817, 819, 827, 829 . . . 837, 839 (two pins per peripheral device).

The plurality of first pins 811, 813, 815, 821, 823, 825 . . . 831, 833, 835 may be, for example, pins into which signals indicating whether to receive commands can be input. The plurality of peripheral devices 810, 820 . . . 830 may determine whether to receive data frames from the command on the basis of signals (for example, voltage levels) applied through the first pins. The plurality of second pins 817, 819, 827, 829 . . . 837, 839 may be, for example, pins for receiving commands. The command may include one common frame and a plurality of data frames.

The plurality of peripheral devices 810, 820 . . . 830 may recognize data frames to acquire data from the command received on the basis of ground pins or NC pins connected through the plurality of first pins 811, 813, 815, 821, 823, 825 . . . 831, 833, 835.

According to an embodiment, the plurality of peripheral devices 810, 820 . . . 830 may include the plurality of first pins and the plurality of second pins 811, 813, 815, 817, 819, 821, 823, 825, 827, 829 . . . 831, 833, 835, 837, 839, and recognize data frames to acquire data from the command received on the basis of the ground pins or the NC pins connected through the plurality of first pins 811, 813, 815, 821, 823, 825 . . . 831, 833, 835 among the plurality of first pins and the plurality of second pins 811, 813, 815, 817, 819, 821, 823, 825, 827, 829 . . . 831, 833, 835, 837, 839.

[Table 3] below shows the case in which it is assumed that the number of plurality of peripheral devices 810, 820 . . . 830 in FIG. 8 is 4 (N=4) according to an embodiment. In [Table 3] below, data frames may be determined through $V_1$ and $V_2$.

TABLE 3

| $V_1$ | $V_2$ | Data Frame Index |
|---|---|---|
| Ground | Ground | #1 |
| NC | NC | #2 |
| Ground | NC | #3 |
| NC | Ground | #4 |

Referring to [Table 3], when $V_1$ and $V_2$ are in ground states, data frame #1 is recognized. When $V_1$ and $V_2$ are in NC states, data frame #2 is recognized. When $V_1$ is in the ground state and $V_2$ is in the NC state, data frame #3 is recognized. Last, when $V_1$ is in the NC state and $V_2$ is in the ground state, data frame #4 is recognized.

According to an embodiment, each of the plurality of peripheral devices 810, 820 . . . 830 may have a determined data frame to acquire data from the received command, and the data frame may be determined through ground pins or NC pins connected through a plurality of left pins 811, 813, 815, 821, 823, 825 . . . 831, 833, 835 included in the plurality of peripheral devices 810, 820 . . . 830.

The plurality of peripheral devices 810, 820 . . . 830 may acquire data from a specific location of the command (for example, a data frame designated thereto among a plurality of data frames included in the command) received through the interface 220, the interface may include, for example, a bus, a general purpose input and output (GPIO), a serial peripheral interface (SPI), or a mobile industry processor interface (MIPI), and the plurality of peripheral devices 810, 820 . . . 830 may be connected to each other through the interface 220 and exchange signals (for example, commands or data). The MIPI may be, for example, RFFE BUS #1 840.

FIG. 9 is a diagram 900 illustrating an example in which the number of plurality of peripheral devices is 4 for data frames and data in the structure in which an electronic device (for example, the electronic device 101 of FIG. 1) performs communication through a serial interface according to various embodiments.

According to an embodiment, a command may have a multi-device control structure. In this case, the command having the multi-device control structure may include one command frame and a plurality of data frames 911=921, 931, 941, 913=923, 933, 943, 915=925, 935, 945, 917=927, 937, 947. Each data frame 911=921, 931, 941, 913=923, 933, 943, 915=925, 935, 945, 917=927, 937, 947 included in the command may include data 912=922, 932, 942, 914=924, 934, 944, 916=926, 936, 946, 918=928, 938, 948 for controlling one of a plurality of peripheral devices to be controlled.

According to an embodiment, 900*a* shows the case in which a data frame index of FIGS. 6, 7, and 8 is #1.

According to an embodiment, 900*b* shows the case in which a data frame index of FIGS. 6, 7, and 8 is #2.

According to an embodiment, 900*c* shows the case in which a data frame index of FIGS. 6, 7, and 8 is #3.

According to an embodiment, 900*d* shows the case in which a data frame index of FIGS. 6, 7, and 8 is #4.

The electronic device according to an example embodiment of the disclosure described above may include: a plurality of peripheral devices, and at least one processor connected to the plurality of peripheral devices by a serial interface, wherein the at least one processor may be configured to control the electronic device to: successively transmit at least one command frame and data frames, at least two peripheral devices among the plurality of peripheral devices included in one serial control command, through the serial interface.

In an example embodiment, the plurality of peripheral devices may include at least one pin configured to receive a signal indicating whether to receive a data frame is input.

In an example embodiment, the at least one pin may comprise an input pin configured to receive a voltage from outside.

In an example embodiment, the at least one processor may be configured to apply voltages of different levels to the at least one pin for the at least two peripheral devices.

In an example embodiment, a maximum number of the plurality of peripheral devices may be determined by a number of pins included in the peripheral devices.

In an example embodiment, based on there being multiple internal power sources, the at least one processor may be configured to apply different voltages by selecting one or more of the internal power sources.

In an example embodiment, the different voltages may be applied through resistors connected to the at least two peripheral devices.

In an example embodiment, the at least one pin may be a ground pin.

In an example embodiment, the at least one pin may be a no-connect (NC) pin.

A method of controlling a plurality of peripheral devices by an electronic device according to an example embodiment of the disclosure may include: transmitting data frames to at least two peripheral devices among the plurality of peripheral devices through a serial interface using one serial control command, and the one serial control command may include one common frame and data frames configured to be transferred to the at least two peripheral devices.

In an example embodiment, a signal indicating whether to receive a data frame may be input to at least one pin included in the plurality of peripheral devices.

In an example embodiment, the signal input to the at least one pin may be a voltage applied from outside.

In an example embodiment, the transmitting may include applying voltages of different levels to the at least one pin for the at least two peripheral devices.

In an example embodiment, a maximum number of plurality of peripheral devices may be determined by a number of pins included in the peripheral devices.

The electronic device according to various embodiments may be one of various types of electronic devices. The electronic devices may include, for example, a portable communication device (e.g., a smartphone), a computer device, a portable multimedia device, a portable medical device, a camera, a wearable device, a a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a plurality of peripheral devices;
    at least one processor comprising processing circuitry and connected to the plurality of peripheral devices by a serial interface; and
    memory storing instructions that, when executed by the at least one processor, individually or collectively, cause the electronic device to:
    generate a serial control command including a common frame and a plurality of data frames, wherein the common frame includes fields in which identification information of the serial control command is to be shared by at least two peripheral devices among the plurality of peripheral devices, and wherein the plurality of data frames correspond to the at least two peripheral devices respectively and include data for controlling operation of the corresponding peripheral device of the at least two peripheral devices,
    transmit, to the at least two peripheral devices among the plurality of peripheral devices, the generated serial control command through the serial interface.

2. The electronic device of claim 1, wherein the plurality of peripheral devices comprise at least one pin configured to receive a signal indicating whether to receive a data frame.

3. The electronic device of claim 2, wherein the at least one pin is an input pin configured to receive a voltage from outside.

4. The electronic device of claim 3, wherein the at least one processor is configured to control the electronic device to apply voltages of different levels to the at least one pin for the at least two peripheral devices.

5. The electronic device of claim 2, wherein a maximum number of the plurality of peripheral devices is determined by a number of pins included in the peripheral devices.

6. The electronic device of claim 4, wherein, based on the electronic device comprising multiple internal power sources, the at least one processor is configured to control the electronic device to apply the different voltages by selecting one or more of the internal power sources.

7. The electronic device of claim 4, wherein the electronic device is configured to apply different voltages through resistors connected to the at least two peripheral devices.

8. The electronic device of claim 2, wherein the at least one pin is a ground pin.

9. The electronic device of claim 2, wherein the at least one pin is a no-connect (NC) pin.

10. A method of controlling a plurality of peripheral devices by an electronic device, the method comprising:
    generating a serial control command including a common frame and a plurality of data frames, wherein the common frame includes fields in which identification information of the serial control command is to be shared by at least two peripheral devices among the plurality of peripheral devices, and wherein the plurality of data frames correspond to the at least two peripheral devices respectively and include data for controlling operation of the corresponding peripheral device of the at least two peripheral devices; and
    successively transmitting, to the at least two peripheral devices among the plurality of peripheral devices, a plurality of serial control commands including the generated serial control command through a serial interface.

11. The method of claim 10, wherein a signal indicating whether to receive a data frame is input to at least one pin included in the plurality of peripheral devices.

12. The method of claim 11, wherein the signal input to the at least one pin comprises a voltage applied from outside.

13. The method of claim 12, wherein the transmitting comprises applying voltages of different levels to the at least one pin for the at least two peripheral devices.

14. The method of claim 11, wherein a maximum number of the plurality of peripheral devices is determined by a number of pins included in the peripheral devices.

15. The electronic device of claim 1, wherein the common frame includes fields for recording a slave address, write/read, a register, a unique slave identifier configuration, and a register address.

16. The electronic device of claim 1, wherein each of the plurality of peripheral devices includes at least one pin and is configured to recognize, based on a voltage level applied through the at least one pin, a data frame among the plurality of data frames included in the generated serial control command to acquire data from the generated serial control command.

17. The method of claim 10, wherein the common frame includes fields for recording a slave address, write/read, a register, a unique slave identifier configuration, and a register address.

18. The method of claim 10, wherein each of the plurality of peripheral devices includes at least one pin and is configured to recognize, based on a voltage level applied through the at least one pin, a data frame among the plurality of data frames included in the generated serial control command to acquire data from the generated serial control command.

\* \* \* \* \*